(12) United States Patent
Hirata

(10) Patent No.: US 10,486,219 B2
(45) Date of Patent: Nov. 26, 2019

(54) METAL PLATE PUNCHING METHOD AND METAL PLATE PUNCHING SYSTEM

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 256 days.

(21) Appl. No.: 15/177,606

(22) Filed: Jun. 9, 2016

(65) Prior Publication Data

US 2016/0361745 A1 Dec. 15, 2016

(30) Foreign Application Priority Data

Jun. 15, 2015 (JP) ................. 2015-120386

(51) Int. Cl.
*B21D 28/00* (2006.01)

(52) U.S. Cl.
CPC .................... *B21D 28/00* (2013.01)

(58) Field of Classification Search
CPC ........ B21D 28/00; B21D 28/04; B21D 28/24; B21D 28/26; B21D 28/265
See application file for complete search history.

(56) References Cited

U.S. PATENT DOCUMENTS

| | | | |
|---|---|---|---|
| 3,338,084 A * | 8/1967 | Stegman, Sr. ......... | B21D 28/06 29/412 |
| 4,342,241 A * | 8/1982 | Eklund ................ | B23D 55/084 83/56 |
| 7,249,546 B1 * | 7/2007 | Fosnaugh ............ | B21D 28/06 83/255 |
| 2011/0252938 A1 | 10/2011 | Hirata | |
| 2014/0000096 A1 | 1/2014 | Takemoto et al. | |
| 2014/0317908 A1 | 10/2014 | Umeda et al. | |

FOREIGN PATENT DOCUMENTS

| | | |
|---|---|---|
| CN | 1170269 | 1/1998 |
| CN | 102218468 | 10/2011 |
| CN | 202918085 | 5/2013 |
| CN | 103516148 | 1/2014 |
| CN | 103959616 | 7/2014 |
| CN | 204030760 | 12/2014 |
| CN | 104348308 | 2/2015 |
| JP | S58-163247 | 9/1983 |
| JP | H01-284433 A | 11/1989 |

(Continued)

OTHER PUBLICATIONS

Ogawa et al., Machine translation of JPH01284433(A), pp. 1-2, translated on Jan. 15, 2019. (Year: 2019).*

(Continued)

*Primary Examiner* — Teresa M Ekiert
(74) *Attorney, Agent, or Firm* — Greenblum & Bernstein, P.L.C.

(57) ABSTRACT

A metal plate punching method for forming a strip portion by punching a metal plate via shearing includes a former step for forming a first side of the strip portion in the metal plate by punching the metal plate and a latter step for forming the strip portion by forming a second side of the strip portion in the metal plate by punching the metal plate while retaining the first side.

8 Claims, 5 Drawing Sheets

(56) References Cited

FOREIGN PATENT DOCUMENTS

JP            H104656       1/1998
JP            2012-115089    6/2012

OTHER PUBLICATIONS

Chinese Office Action for CN App. No. 201610414908.6 dated Nov. 1, 2017, along with English-language translation thereof.
Chinese Office Action for counterpart CN App. No. 201610414908.6 dated Nov. 1, 2017, along with English-language translation thereof.
Japanese Office Action for counterpart JP App. No. 2015-120386 dated Oct. 30, 2018, along with English-language translation thereof.

* cited by examiner

METAL PLATE PUNCHING METHOD AND METAL PLATE PUNCHING SYSTEM

BACKGROUND OF THE INVENTION

The present invention relates to a punching method and a punching system that form strip portions by punching a metal plate via shearing, and particularly to a punching method and a punching system that are suitable for forming narrow strip portions.

The rotor of a permanent magnet synchronous motor has a rotor body with through-holes. A permanent magnet is inserted in each through-hole. The rotor body is formed by laminating core plates, which are a number of magnetic steel plates. In this structure, to reduce leakage flux, the permanent magnets are preferably arranged in the outer circumferential portion of the rotor to be close to the stator. This improves the operating efficiency of the motor. To arrange the permanent magnets in the outer circumferential portion of the rotor, the width of the parts of the steel plates between the through-holes and the outer circumference of the rotor, that is, the width of strip portions that extend along the outer circumference of the rotor, must be minimized.

However, such narrow strip portions are difficult to form. Typically, core plates are worked via shearing by a press to form through-holes. However, since narrow strip portions would be severed by the pressure of shearing, narrow strip portions are difficult to form. If through-holes were formed by laser beam machining in an attempt to form narrow strip portions, not only would the machining time be prolonged, but also the heat would be highly likely to sever the strip portions.

If through-holes were formed through cutting to form narrow strip portions, a longer time than in the case of the laser beam machining would be required. Also, wear of the cutting edges would lower the cutting accuracy.

Japanese Laid-Open Patent Publication No. 2012-115089 discloses a motor designed to improve the operating efficiency by reducing leakage flux without forming narrow strip portions. The structure of the disclosed motor includes a rotor core having a main body, which is a bulk body. The bulk body has recessed grooves on the outer circumference. Each groove receives a steel plate laminate, which is formed by laminating magnetic steel plates formed separately from the bulk body. A permanent magnet is provided between the bulk body and each steel plate laminate.

In the configuration of the motor disclosed in Japanese Laid-Open Patent Publication No. 2012-115089, the rotor core is constituted by the bulk body and the steel plate laminates, which are formed separately from the bulk body. This increases the number of components and complicates the structure. Further, a height difference is likely to be created between the bulk body and the steel plate laminates in the thickness direction. Such a height difference causes leakage flux, which results in a lowered motor efficiency.

SUMMARY OF THE INVENTION

Accordingly, it is an objective of the present invention to provide a metal plate punching method that readily forms narrow strip portions that are effective in reducing leakage flux.

To achieve the foregoing objective and in accordance with one aspect of the present invention, a metal plate punching method for forming a strip portion by punching a metal plate via shearing is provided. The method includes: a former step for forming a first side of the strip portion in the metal plate by punching the metal plate; and a latter step for forming the strip portion by forming a second side of the strip portion in the metal plate by punching the metal plate while retaining the first side.

To achieve the foregoing objective and in accordance with another aspect of the present invention, a metal plate punching system is provided. To form a plurality of strip portions by punching a metal plate via shearing, a plurality of holes are punched out in a circular area on the metal plate. An inner surface of each hole constitutes a first side of one of the strip portions. An area surrounding the holes is punched out to form a circular plate. The strip portions are formed between inner walls of the holes and an outer circumferential wall of the circular plate. The metal plate punching system includes a first punching apparatus, which punches out the holes in the metal plate and a second punching apparatus, which punches out the circular plate from the metal plate. The second punching apparatus includes a plurality of retaining blocks, which enters the holes prior to the punching out of the circular plate, thereby retaining the first sides of the strip portions.

DETAILED DESCRIPTION OF THE PREFERRED EMBODIMENTS

One embodiment of the present invention will now be described with reference to the drawings.

First, the structure of a rotor core 21 will be described. The rotor core 21 is used in a permanent magnet synchronous motor, which is a rotating electric machine.

Figure 1:
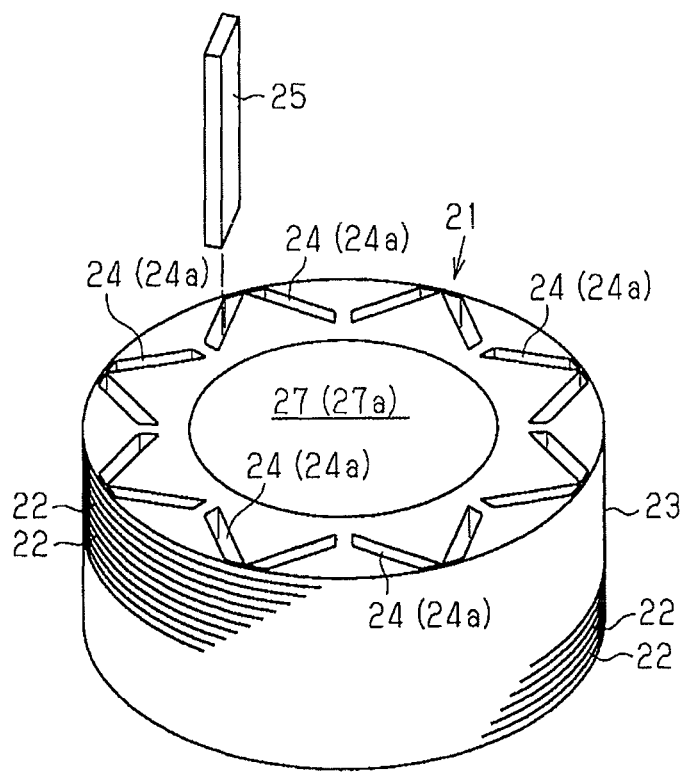
FIG. 1 is an exploded perspective view of a rotor core.
Figure 2:
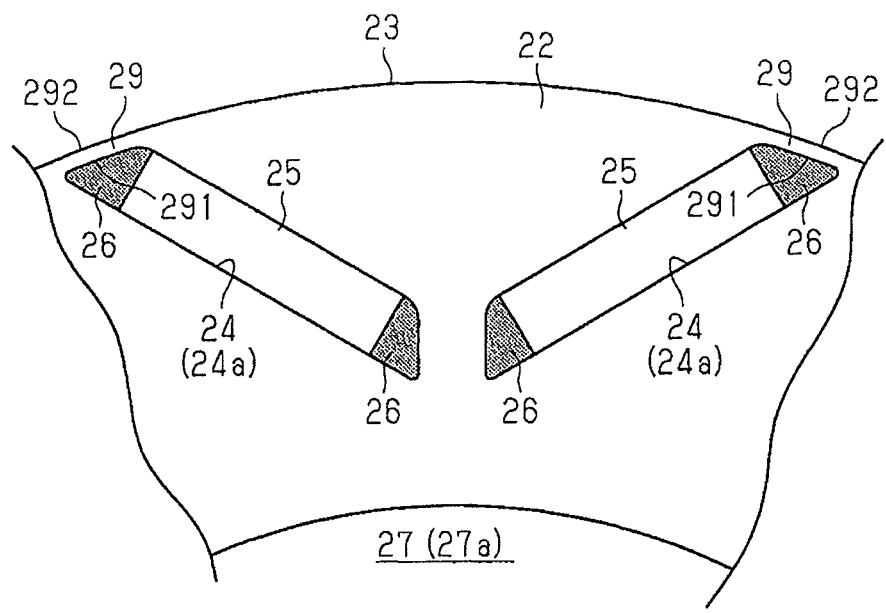
FIG. 2 is a partial plan view of the rotor core of FIG. 1.
Figure 4:
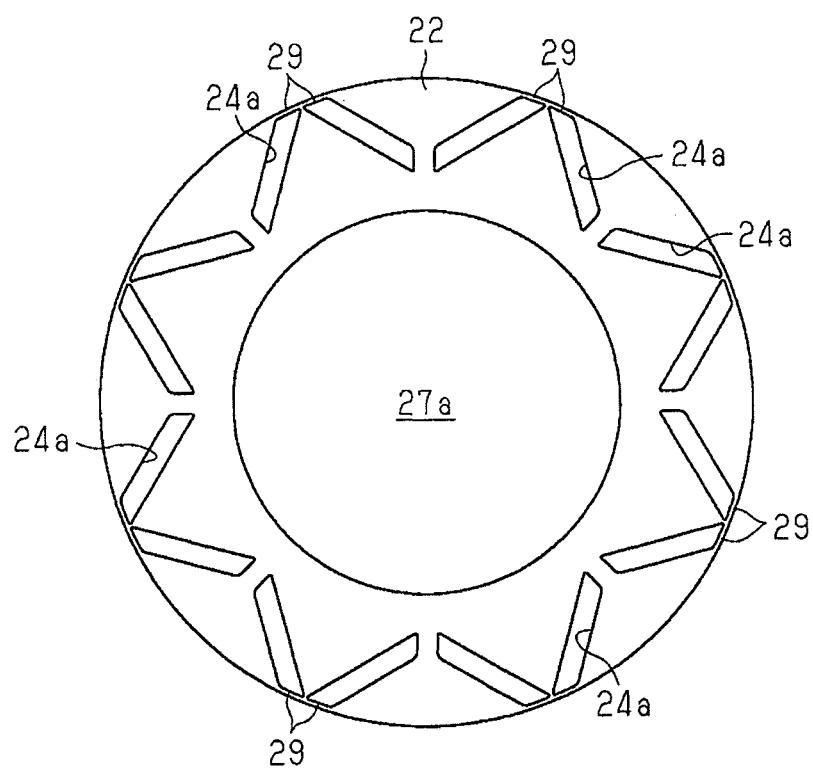
FIG. 4 is a plan view of a core plate.

As shown in FIG. 1, the rotor core 21 includes a core body 23, which is formed by laminating core plates 22. The core plates 22 are circular punched products and made of magnetic steel plates. As shown in FIG. 4, each core plate 22 has first holes 24a and a second hole 27a. The first holes 24a extend through the core plate 22 along the thickness and are arranged along the circumference. The second hole 27a also extends through the core plate 22 along the thickness and is arranged at the center of the core plate 22. As shown in FIG. 1, the core plates 22 are laminated with the first holes 24a aligned with respect to the laminating direction, so that the core body 23 has accommodation holes 24, which extend through the core body 23 along the thickness and are arranged along the circumference of the core body 23. Each accommodation hole 24 accommodates a permanent magnet 25. As shown in FIG. 2, each accommodation hole 24 of the core body 23 is filled with thermosetting resin 26, such as an epoxy resin, to fix the permanent magnet 25. Further, as shown in FIG. 1, the core plates 22 are laminated with the second holes 27a aligned with respect to the laminating direction, so that the core body 23 has a shaft hole 27, which extends through the core body 23 along the thickness and receives a rotary shaft (not shown) of the motor.

As shown in FIGS. 2 and 4, a narrow strip portion 29 is formed between the inner wall of each first hole 24a and the outer circumferential wall of the core plate 22. The width of the strip portion 29 is, for example, 0.1 millimeters. In each core plate 22, a part of the inner wall of each first hole 24a constitutes a first side 291 of the corresponding strip portion 29. On the outer circumferential wall of the core plate 22, a part that corresponds to the first side 291 constitutes a second side 292 of the strip portion 29.

The rotor core 21 is manufactured in the following manner.

Figure 3:
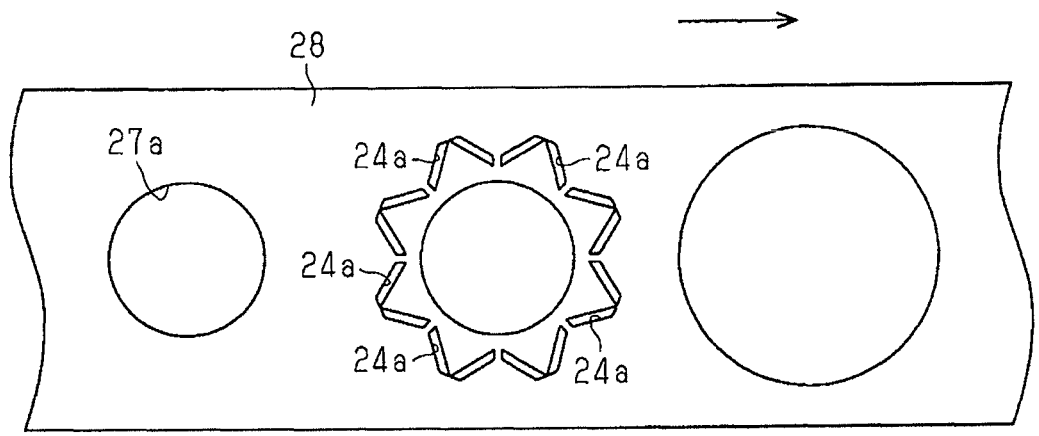
FIG. 3 is a plan view illustrating a punched state of a workpiece.

As shown in FIG. 3, a belt-shaped workpiece 28 is intermittently moved in one direction (the direction of the arrow in FIG. 3). When the workpiece 28 is stopped, the first holes 24a for a single core plate 22 are formed in a circular area on the workpiece 28 via shearing. Also, a second hole 27a is formed at the center of the group of the first holes 24a via shearing. The second hole 27a may be punched simultaneously with punching of the first holes 24a. Alternatively, the second hole 27a may be punched before or after punching of the first holes 24a.

Subsequently, the workpiece 28 is punched via shearing in a circular area that is radially outward of the first holes 24a and has the center coinciding with the center of the group of the first holes 24a, so that a circular core plate 22 shown in FIG. 4 is obtained. As shown in FIG. 1, core plates 22 are laminated with the first holes 24a and the second holes 27a aligned with respect to the laminating direction to form a core body 23 having accommodation holes 24 and a shaft hole 27. Then, a permanent magnet 25 is accommodated in each accommodation hole 24 of the core body 23, and each accommodation hole 24 is filled with thermosetting resin 26. The thermosetting resin 26 in the accommodation holes 24 is heated and hardened to fix the permanent magnets 25 in the accommodation holes 24, so that the rotor core 21 is completed.

Figure 5:
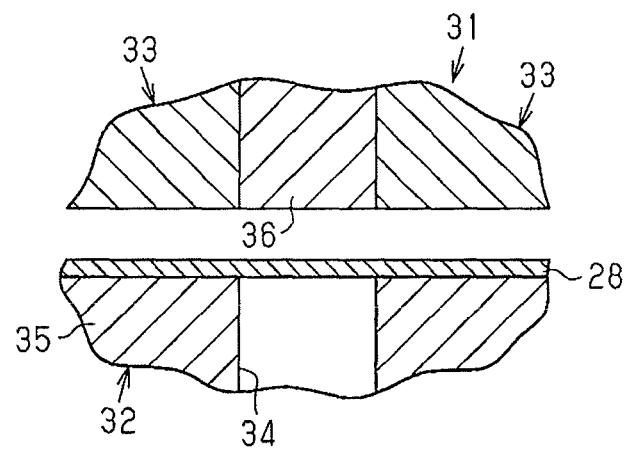
FIG. 5 is a partial cross-sectional view showing a punching starting state in a first punching apparatus.
Figure 6:
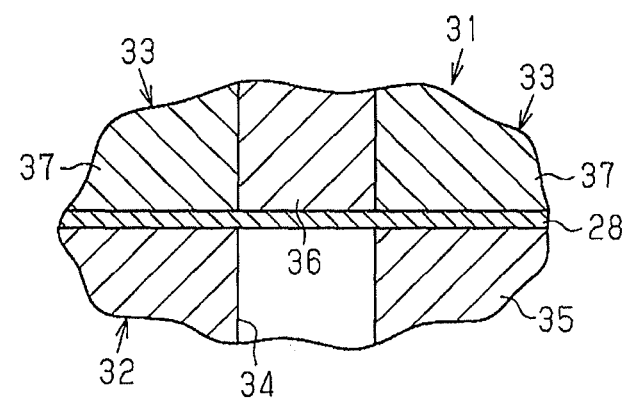
FIG. 6 is a partial cross-sectional view showing a state immediately before punching in the first punching apparatus.
Figure 7:
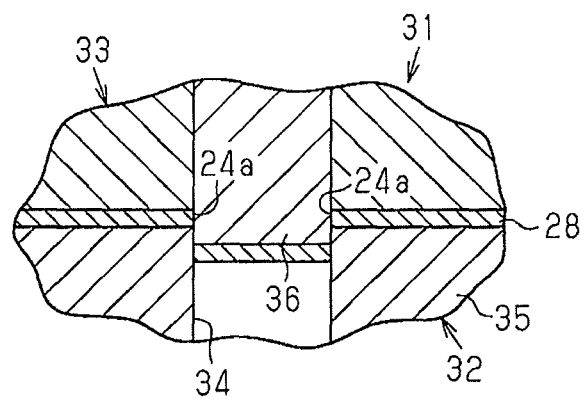
FIG. 7 is a partial cross-sectional view showing a punching finished state in the first punching apparatus.

The first holes 24a of each core plate 22 are formed by punching the workpiece 28 with a first punching apparatus 31, which constitutes a metal plate punching system shown in FIGS. 5 to 7. The first punching apparatus 31 has a stationary lower die 32 and an upper die 33, which is lifted and lowered. The lower die 32 has a die block 35. The die block 35 has punching holes 34 for punching the first holes 24a. The upper die 33 has punches 36 and a holding block 37. Each punch 36 faces one of the punching holes 34 and is allowed to enter the punching hole 34. The holding block 37 holds the workpiece 28 in the areas about the punches 36.

As shown in FIGS. 5 and 6, when the workpiece 28 is stopped during intermittent movement over the die block 35, the upper die 33 is lowered and the workpiece 28 is held by the holding block 37. Then, as shown in FIGS. 6 and 7, the punches 36 are lowered with the workpiece 28 held by the holding block 37, so that the punches 36 punch the workpiece 28 and enter the punching holes 34 to form the first holes 24a in the workpiece 28.

After the first holes 24a are punched, the core plate 22 is punched out from the workpiece 28 by a second punching apparatus 41.

Figure 8:
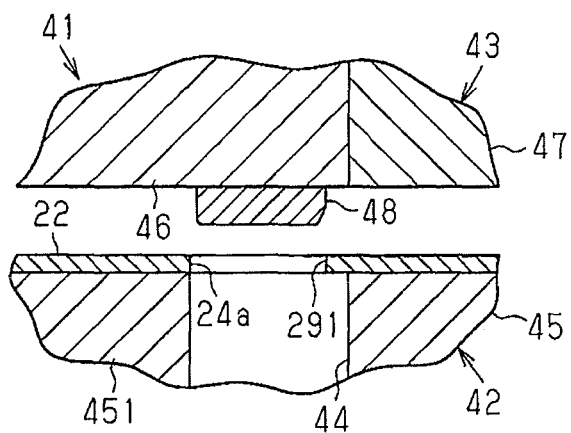
FIG. 8 is a partial cross-sectional view showing a punching starting state in a second punching apparatus.
Figure 9:
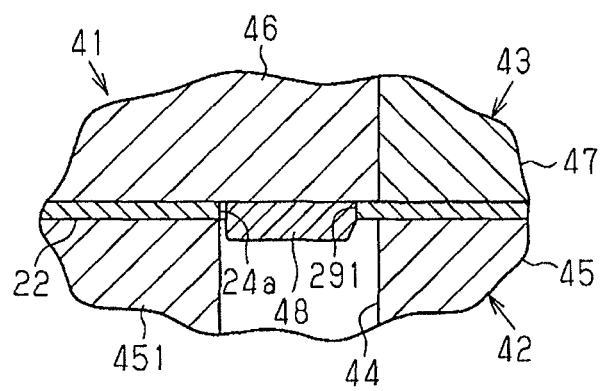
FIG. 9 is a partial cross-sectional view showing a state immediately before punching in the second punching apparatus.
Figure 10:
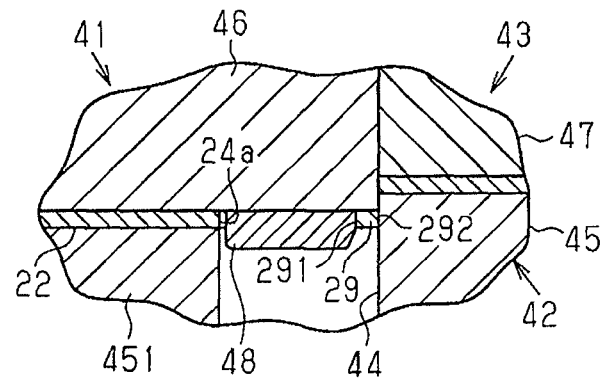
FIG. 10 is a partial cross-sectional view showing a punching finished state in the second punching apparatus.

Specifically, as shown in FIGS. 8 to 10, the second punching apparatus 41 constitutes the metal plate punching system and includes a stationary lower die 42 and an upper die 43, which is lifted and lowered. The lower die 42 has a die block 45. The die block 45 has a punching hole 44, of which the inner circumference corresponds to the outer circumference of the core plate 22. The die block 45 has a vertically movable sliding block 451, which corresponds to the outer shape of the core plate 22 and is urged upward by an urging means such as a spring (not shown).

Figure 11:
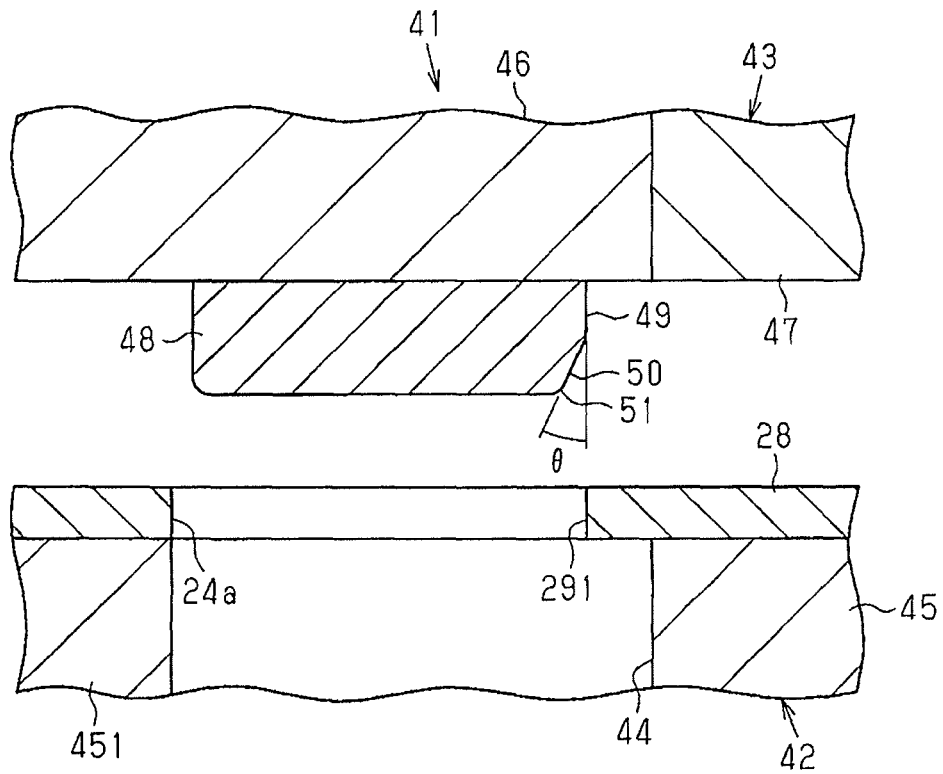
FIG. 11 is a cross-sectional view showing the relationship between a retaining block and an accommodation hole.
Figure 12:
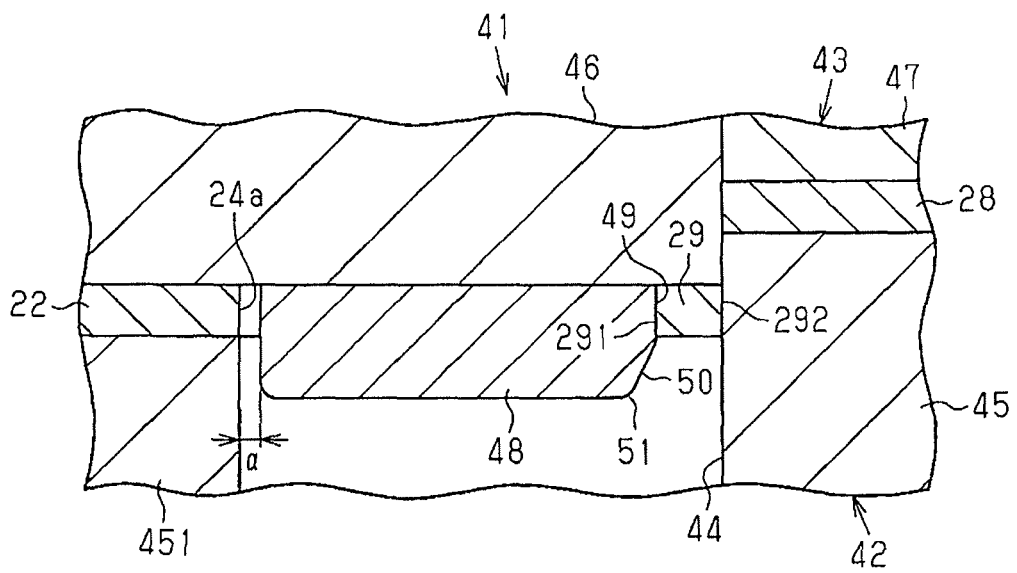
FIG. 12 is a cross-sectional view showing the relationship between the retaining block and a strip portion.

The upper die 43 has a punch 46 and a holding block 47. The punch 46 corresponds to the outer shape of the core plate 22 and is allowed to enter the punching hole 44. The holding block 47 is located on the outer circumferential side of the punch 46. Retaining blocks 48 are provided on the bottom surface of the punch 46 at positions corresponding to the punched first holes 24a. As shown in FIGS. 11 and 12, each retaining block 48 has a retaining surface 49 and a guiding surface 50 on a side. The retaining surface 49 is configured to retain the inner surface (the first side 291) of the corresponding first hole 24a at a position that will correspond to a strip portion 29 of the core plate 22 after the core plate 22 will have been punched, that is, at a position at which the strip portion 29 will be formed. The guiding surface 50 is located below the retaining surface 49 and inclined inward toward the lower end. The inclination angle θ of the guiding surface 50 relative to the retaining surface 49 is set to 10 to 30 degrees. As shown in FIG. 12, a clearance α exists between a part of the outer surface of the retaining block 48 except for the retaining surface 49 and the inner surface of the first hole 24a. A corner portion 51 between the guiding surface 50 and the bottom surface of the retaining block 48 is formed as an arcuately curved surface.

As shown in FIGS. 8, 9, and 11, when the upper die 43 of the second punching apparatus 41 is lowered to punch the workpiece 28, each retaining block 48 enters the corresponding first hole 24a. At this time, as shown in FIG. 12, the clearance α exists between the inner surface of the first hole 24a and a part of the outer surface of the retaining block 48, specifically, between the inner surface of the first hole 24a and a part of the outer surface of the retaining block 48 that does not face a part of the inner surface of the first hole 24a at which the strip portion 29 will be formed. In other words, the clearance α exists between the inner surface of the first hole 24a and a part of the retaining block 48 that does not face the first side 291 of the strip portion 29. Thus, the part with the clearance α will not contact the inner surface of the first hole 24a. A part of the retaining block 48 that faces a part of the inner surface of the first hole 24a at which a strip portion 29 will be formed, that is, a part of the retaining block 48 that faces the first side 291 is constituted by the retaining surface 49, the corner portion 51, which is formed as a curved surface, and the inclined guiding surface 50, which connects the retaining surface 49 and the corner portion 51. Thus, the guiding surface 50 smoothly guides the retaining surface 49 toward a part of the inner surface of the first hole 24a at which the strip portion 29 will be formed, that is, toward the first side 291. As shown in FIG. 9, the retaining surface 49 contacts a part of the inner surface of the first hole 24a that corresponds to a part at which the strip portion 29 will be formed, that is, the first side 291 of the strip portion 29, and retains the first side 291 to restrain a part of the workpiece 28 at which the strip portion 29 will be formed from moving.

Subsequently, as shown in FIGS. 10 and 12, the upper die 43 is lowered so that the punch 46 punches an outer circumferential portion slightly spaced from the inner circumferences of the first holes 24a in a circular shape. This forms the second sides 292 of the strip portions 29. Thus, a core plate 22 having the strip portions 29 is formed. At this time, even when the outer circumferential portion of the first holes 24a is being punched, the strip portions 29 are retained by the retaining surfaces 49. Thus, the strip portions 29 are neither severed nor deformed, but are properly formed in the core plate 22.

Therefore, the narrow strip portions 29 are formed between the outer circumferential wall of the core plate 22 and the inner walls of the first holes 24a.

Accordingly, the present embodiment achieves the following advantages.

(1) With the first sides 291 of the strip portions 29 retained by the retaining surfaces 49 of the retaining blocks 48, the core plate 22 is punched out of the workpiece 28 to form the second sides 292 of the strip portions 29. Thus, when punching out the core plate 22, the parts at which the strip portions 29 will be formed are prevented from moving. Therefore, even though the strip portions 29 are narrow, the strip portions 29 are not bent, twisted, or severed. This allows core plates 22 having highly accurately shaped strip portions 29 to be punched out of the workpiece 28. Since the permanent magnets 25 are accommodated in the accommodation holes 24 of the core 21, which uses the core plates 22, leakage flux is reduced and a motor that operates highly efficiently is obtained. Unlike the motor of Japanese Laid-Open Patent Publication No. 2012-115089, the motor of the present embodiment is not constituted by a core body and components formed separately from the core body. Thus, the number of components is not increased.

(2) The strip portions 29 are formed through pressing. Thus, unlike the laser beam machining, which may sever the strip portions 29 with heat, or the cutting, in which wear of the cutting tool may lower the machining accuracy, the core plate 22 having the strip portions 29 can be highly accurately and efficiently formed through punching.

(3) Since the strip portions 29 are formed in two separate steps, which are the former step and the latter step, the forming apparatus does not need to have a narrow die for forming the strip portions 29. That is, if the strip portions 29 are formed in a single punching step, the forming apparatus needs to have a narrow die that corresponds to the strip portions 29, and such a die can be easily damaged. In the present embodiment, the forming apparatus does not need to have such a narrow die. The forming apparatus can thus be constituted by dies having a high strength.

(4) In the former step, first holes 24a are punched out in a circular area on the workpiece 28. In the latter step, a circular core plate 22 is formed by punching the area surrounding the group of the first holes 24a while leaving the width of the strip portions 29. As a result, the strip portions 29 are formed between the inner walls of the first holes 24a and the outer circumferential wall of the core plate 22. Thus, a core plate 22 for the rotor core 21 having strip portions 29 of the same width is formed.

(5) Each retaining block 48 has a guiding surface 50, which is located below and continuous with the retaining surface 49. The guiding surface 50 is inclined inward in the first hole 24a toward the lower end. Accordingly, the retaining surface 49 is guided toward a part of the inner surface of the first hole 24a at which the strip portion 29 will be formed, that is, toward the first side 291 of the strip portion 29, while being prevented from interfering with the workpiece 28. Also, a part of the inner surface of the first hole 24a that corresponds to the position at which the strip portion 29 will be formed, that is, the first side 291 of the strip portion 29 can be properly retained. This effectively prevents the punched strip portion 29 from being deformed or severed.

The present invention is not limited to the above embodiment, but may be modified as follows.

In the above illustrated embodiment, the first holes 24a are formed in the workpiece 28, and an area on the outer side of the first holes 24a is punched to form the strip portions 29. However, each strip portion 29 may be formed by punching out recesses on both sides of a part of the workpiece 28 at which the strip portion 29 will be formed.

In the above illustrated embodiment, the present invention is applied to the rotor core 21 for a motor. However, the present invention may be applied to a stator core. Alternatively, the present invention may be applied to a rotor core or a stator core for a generator.

In the above illustrated embodiment, the strip portions 29 are formed in the core plates 22 used in the rotor core 21. However, the present invention may be applied to articles other than the core plates 22, for example, to narrow melting portions of a power fuse. In this case, the workpiece may be a metal plate other than a magnetic steel plate, for example, a copper plate or an aluminum plate.

In the above illustrated embodiment, the strip portions 29 are formed in two punching steps, which are the former step and the latter step. However, the strip portions 29 may be formed through three or more punching steps. For example, the workpiece 28 may be punched twice to form the first hole 24a.

The invention claimed is:

1. A metal plate punching method for forming a punched product having a plurality of strip portions in a circumferential region of the punched product by punching a metal plate via shearing, the method comprising:
    forming a first side of each strip portion in the metal plate by punching the metal plate to form a plurality of holes in a circular area on the metal plate, wherein a radially-outward inner surface of each hole constitutes the first side of respective strip portions; and
    forming the punched product as a circular plate by punching out an area surrounding the holes, wherein an outer circumferential wall of the circular plate forms a second side of each strip portion so that the strip portions are formed between inner walls of the holes and the outer circumferential wall of the circular plate,
    wherein the forming the punched product as the circular plate comprises forming the outer circumferential wall of the circular plate by punching out the area surrounding the holes while holding a part of the circular plate except for the holes and the strip portions from both sides in a thickness direction of the circular plate and while retaining the first side of each strip portion in contact with a retaining block arranged in a corresponding one of the holes, thereby forming the strip portions, wherein the retaining block is configured to provide a clearance between the retaining block and a radially-inward inner surface of the corresponding hole when arranged in the corresponding hole.

2. The metal plate punching method according to claim 1, wherein the first side is planar.

3. The metal plate punching method according to claim 1, wherein the holes are each trapezoidal.

4. The metal plate punching method according to claim 1, wherein the holding the part from both sides comprises holding the part from both sides immediately opposite each other in a thickness direction of the circular plate.

5. A metal plate punching system, wherein
to form a plurality of strip portions in a circumferential region of a circular plate by punching a metal plate via shearing, a plurality of holes are punched out in a circular area on the metal plate,
an inner wall surface of each hole constitutes a first side of a respective strip portion,
an area surrounding the holes is punched out to form the circular plate, and
the strip portions are formed between respective inner wall surfaces of the holes and an outer circumferential wall of the circular plate,
the metal plate punching system comprising:
a first punching apparatus, which punches out the holes in the metal plate; and
a second punching apparatus, which punches out the circular plate from the metal plate, wherein the second punching apparatus includes:
a die block having a sliding block and a punching hole, wherein an inner circumference of the punching hole corresponds to an outer circumference of the circular plate;
a punch that is configured to enter the punching hole for punching out the circular plate from the metal plate; and
a plurality of retaining blocks, which are provided on the punch, enters the holes prior to the punching out of the circular plate, and respectively maintain contact with the first sides of the strip portions during the punching out,
wherein the sliding block and the punch are configured to hold a part of the circular plate except for the holes and the strip portions from both sides in a thickness direction of the circular plate when the punch punches out the circular plate from the metal plate, and
wherein the retaining blocks are configured to, while in contact with the first sides of the strip portions, provide a clearance between each retaining block and a radially-inward inner wall surface of a respective hole when arranged in the hole.

6. The metal plate punching system according to claim 5, wherein each retaining block includes:
a retaining surface, which retains the first side of a corresponding one of the strip portions, and
a guiding surface, which enters a corresponding hole before the retaining surface to guide the retaining surface to the first side while avoiding interference between the retaining block and the metal plate.

7. The metal plate punching system according to claim 5, wherein the first side is planar.

8. The metal plate punching system according to claim 5, wherein the holes are each trapezoidal.

* * * * *